(No Model.)
W. PORTER.
PLANER CHUCK.
No. 300,637. Patented June 17, 1884.
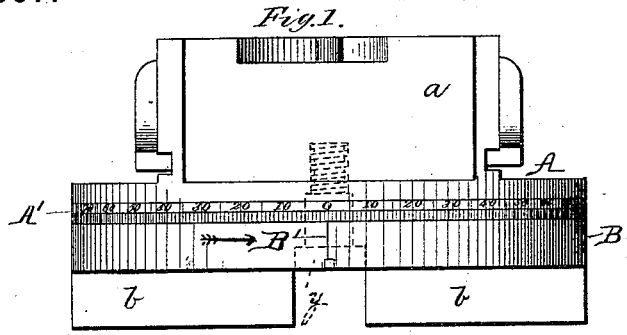
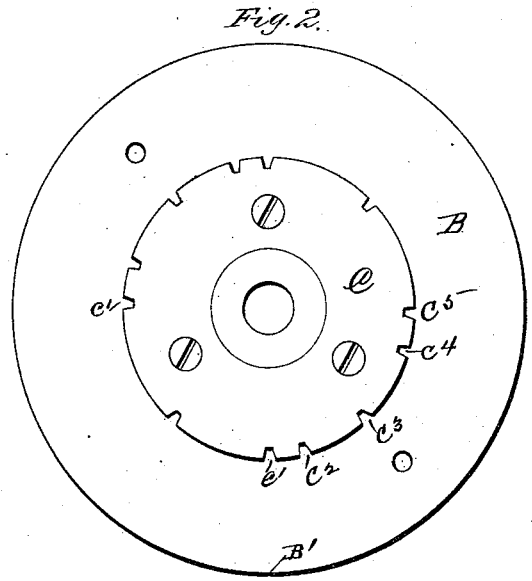
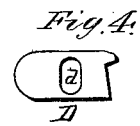
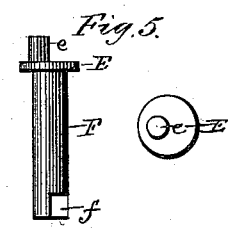
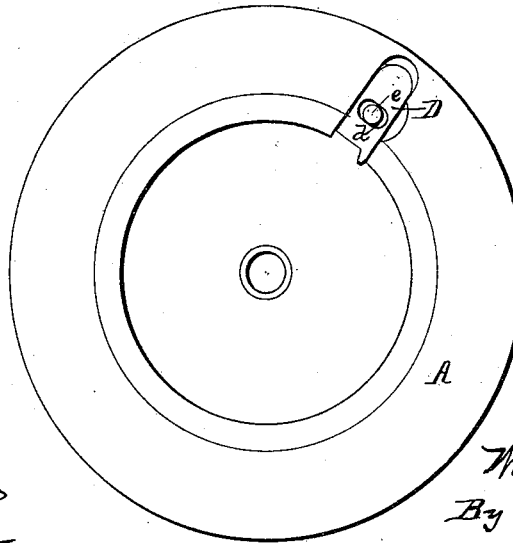
Witnesses.
Chas S Kalb
Calvin Clarke
Inventor
Wallace Porter
By J N Kalb
Attorney

UNITED STATES PATENT OFFICE

WALLACE PORTER, OF NEW HAVEN, CONNECTICUT.

PLANER-CHUCK.

SPECIFICATION forming part of Letters Patent No. 300,637, dated June 17, 1884.

Application filed November 23, 1883. (No model.)

*To all whom it may concern:*

Be it known that I, WALLACE PORTER, a citizen of the United States of America, residing at New Haven, in the county of New Haven and State of Connecticut, have invented certain new and useful Improvements in Planer-Chucks, of which the following is a specification, reference being had therein to the accompanying drawings.

My invention relates to improvements in planer-chucks; and its object is to provide an accurate and reliable means for setting or adjusting the chuck to hold the material or article to be planed at any angle. The chuck is formed with an upper and lower plate, between which is placed the division or index plate. The lower plate is provided with lugs or ribs on the under side, which fit into a slot in the planer-bed and prevent the chuck from being turned thereon. The upper plate bears the clamping-jaws, and is provided with a scale or graduations on its periphery, which, in connection with a mark on the lower stationary plate, indicate the angle at which the jaws are set to hold the article to be planed relatively to any given line. The division-plate is a smaller disk lying between these two and secured to one of them. It is provided with serrations or notches in the edge, cut at intervals, denoting any desired number of degrees or any desired arc of a circle. Into these notches a dog held in the opposite plate is thrust, which serves to lock the said plate after it has been set by the graduations on the exterior. The dog is operated by an eccentric-pin which projects into a slot therein, and also extends through the upper plate and furnishes a means for setting the dog in or out.

The accompanying drawings form a part of this specification, and illustrate what I consider the best means of carrying the invention into practice.

Figure 1 is a side elevation; Fig. 2, a plan of bottom plate, showing division-plate. Fig. 3 is an inverted plan of top plate; Fig. 4, a detail of dog; Fig. 5, a detail of pin in two positions.

Similar letters of reference indicate corresponding parts in all the figures where they occur.

A is the upper plate of the chuck, which carries the jaws $a$ $a$. B is the lower plate, which is provided on its under side with the lugs or ribs $b$ $b$, which are intended to enter openings in the planer-bed and prevent the chuck from turning therein. The two plates A and B are held together by a screw, $z$. The circumference of the upper plate is provided with a scale or line of degrees, A', and the under plate with a mark, B'. The upper plate has liberty to turn upon the under one, and may be set so as to bring the two plates into any desired relative position. When the desired angle is reached by reference to the scale on the rim of the plates, it is locked by the following mechanism, which constitutes the essence of my invention: A division-plate, C, is provided between the two plates A and B, and is secured to one of them. It is provided on the edge with notches or serrations $c'$ $c^2$, &c., which are cut at proper distances to measure any number of degrees that may be desired between them—as a half-circle, quarter, eighth, or any other, as may be desired, and as many as may be desired. As shown in Fig. 2, the notch $c'$ indicates 0; $c^2$, 15°; $c^3$, 45°; $c^4$, 70°; $c^5$, 90°, and so on, as may be desired, around the periphery of the disk C. Into these notches a dog, D, is caused to project when the upper plate is to be locked. The dog D is provided with a slot, $d$, in which a pin, $e$, works. The pin $e$ is set eccentrically upon the disk or head E of the pin or bolt F. The dog is confined on either side by the metal of the plate A, and when the bolt F is turned the eccentric action of the pin $e$ causes the dog to be thrust in toward the plate C or drawn away therefrom, according to the direction in which the bolt is turned. A head, $f$, is provided upon the bolt F on the exterior of the plate A, by means of which the bolt is turned. The disk or head E rests in a seat of similar shape in the plate A. The zero mark or notch $c'$ on plate C corresponding with mark B' on plate B, when the upper plate, A, which holds the work between its jaws, is turned to cause the zero-mark on it to be carried away from line B', and brings some angle or degree on the scale A' over mark B', then, if dog D is thrust inward and caused to engage with the notch in plate C, the two plates A and B will be locked together—as, for instance, if plate A be turned in the direction of the arrow, Fig. 1, until it causes degree 15 to register with mark B', and then the dog D be thrown inward, it will engage in notch $c^2$ and lock the parts A and B. It will be understood that the plate B is held stationary on the planer-bed by the ribs $b\ b$ entering a slot or slots therein. This gives the exact angle, and at the same time serves to hold the two plates accurately upon each other at the desired angle while the chuck is being clamped upon the planer-bed.

What I claim is—

1. In a planer-chuck, the combination of the plates A and B, one of which is provided with a disk or plate, C, having notches in its edge, as described, and the other being provided with a dog, and means, substantially as described, for throwing it into and out of engagement with the notched disk C, as set forth.

2. In a planer-chuck, the combination, with the plates A and B, of the division-plate C, having the notches $c'\ c^2$, &c., the dog D, and bolt F, having eccentric-pin $c$, as set forth.

3. In a planer-chuck, the combination of the two plates A and B, having the scale A' and mark B', with the middle plate, C, provided with notches $c'\ c^2$, &c., a dog, D, for engagement with said notches, and a bolt, F, provided with eccentric-pin $e$, for operating the dog, as set forth.

In testimony whereof I affix my signature in presence of two witnesses.

WALLACE PORTER.

Witnesses:
GEORGE TERRY,
DANIEL S. GLENNEY, Jr.